United States Patent
Saito et al.

(10) Patent No.: US 8,371,835 B2
(45) Date of Patent: Feb. 12, 2013

(54) MOLD FOR EXTRUSION FORMING OF CERAMIC ARTICLES

(75) Inventors: Takao Saito, Nagoya (JP); Teruyoshi Mori, Nagoya (JP); Takehide Shimoda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 395 days.

(21) Appl. No.: 12/352,152

(22) Filed: Jan. 12, 2009

(65) Prior Publication Data

US 2009/0186116 A1    Jul. 23, 2009

(30) Foreign Application Priority Data

Jan. 17, 2008 (JP) ................... 2008-007996

(51) Int. Cl.
*B29C 47/12* (2006.01)
(52) U.S. Cl. ............... 425/192 R; 264/177.12; 425/380; 425/464; 425/467
(58) Field of Classification Search ............... 425/192 R, 425/380, 464, 467; 264/177.12
See application file for complete search history.

(56) References Cited

U.S. PATENT DOCUMENTS

| | | | | |
|---|---|---|---|---|
| 5,070,588 A | * | 12/1991 | Miwa et al. | 76/107.1 |
| 5,256,054 A | * | 10/1993 | Cocchetto et al. | 425/462 |
| 2002/0185776 A1 | | 12/2002 | Shibagaki et al. | |
| 2003/0064126 A1 | | 4/2003 | Miyazaki et al. | |
| 2005/0031727 A1 | * | 2/2005 | Matsuoka et al. | 425/461 |
| 2006/0088621 A1 | * | 4/2006 | Matsuoka et al. | 425/382 R |

FOREIGN PATENT DOCUMENTS

| | | |
|---|---|---|
| EP | 0 389 253 A2 | 9/1990 |
| JP | A-07-052129 | 2/1995 |
| JP | A-11-34026 | 2/1999 |
| JP | A-2002-283327 | 10/2002 |
| JP | B2-3648031 | 5/2005 |
| JP | A-2008-149595 | 7/2008 |

OTHER PUBLICATIONS

Oct. 31, 2011 Search Report in European Patent Application No. 09250094.1.

* cited by examiner

*Primary Examiner* — Yogendra Gupta
*Assistant Examiner* — Joseph Leyson
(74) *Attorney, Agent, or Firm* — Oliff & Berridge, PLC

(57) ABSTRACT

There is provided a mold for extrusion forming of ceramic articles which is excellent in wear resistance and can remarkably decrease forming defects in the vicinity of outer peripheries thereof. The mold for the extrusion forming of the ceramic articles includes a die 1 having a plurality of back holes 9, and slits 8; a back pressing plate 12 and a back spacer 13 to adjust the amount of the kneaded clay to be supplied; and a pressing plate 11 and a spacer 10 to regulate the shape and size of the formed ceramic article. At least a portion of the supply end 22 of the die 1 which overlaps with the back pressing plate 12 is flattened, and a surface roughness (Ra) thereof is in a range of 0.05 μm to 10 μm.

10 Claims, 7 Drawing Sheets

Related Art

Related Art

MOLD FOR EXTRUSION FORMING OF CERAMIC ARTICLES

BACKGROUND OF THE INVENTION

1. Field of the Invention

The present invention relates to a mold for extrusion forming of ceramic articles which is preferably used for extrusion forming of, for example, ceramic honeycomb structures. More particularly, it relates to a mold for extrusion forming of ceramic articles which is excellent in wear resistance and can remarkably decrease forming defects in the vicinity of outer peripheries thereof which are easily generated during the extrusion forming of the ceramic articles having highly dense honeycomb-shaped thin walls.

2. Description of the Related Art

A ceramic honeycomb structure is mainly used as a catalyst carrier which is used to remove atmospheric contamination substances in an exhaust gas discharged from an internal combustion engine, a boiler or the like, or as a filter for collecting diesel fine particles.

Heretofore, as a mold for use in extrusion forming of such a ceramic honeycomb structure, there has been known a mold for forming a honeycomb article which includes a die having groove-like slits formed by cell blocks on the surface of a mother material of a stainless steel, SKD or the like, and including back holes provided on the back surface of the die so as to communicate with the slits.

In such a mold for forming the honeycomb article, a surface membrane is used to adjust the slit width of each cell block and to improve the durability of the die. For example, the surface membrane can be obtained by forming a nickel plating layer on the surface of a cell block main body, and then forming, on the nickel plating film, a CVD or PVD layer containing as main components one or more substances selected from the group consisting of TiC, TiN and TiCN, or a composite plating layer where hard powder of SiC, diamond, CBN or the like is dispersed in a nickel plating film (e.g., see Japanese Patent Application Laid-Open No. 7-52129).

In Japanese Patent Application Laid-Open No. 7-52129, a mold for extrusion forming of the ceramic honeycomb structure shown in FIG. 11 is disclosed. The extruding direction of a kneaded ceramic clay is a direction from the upside to the downside, and a back pressing portion 3 is capable of adjusting the amount of the kneaded clay to be fed into the mold. A die 1 is fixed by a pressing portion 2, and the kneaded clay extruded through a gap 5 between the die 1 and the pressing portion 2 adjustably forms the outer peripheral portion of a formed ceramic article 4 through an inclined face 6 and a facing face 7.

Moreover, in Japanese Patent Application Laid-Open No. 2002-283327, a vertically sectional view of a honeycomb structure forming device 50 shown in FIG. 2 is described. In FIG. 2, the honeycomb structure forming device 50 includes a die 54 having back holes 53 for supplying a forming material and slits 52 for extruding the forming material, and a pressing plate 55 provided on the downstream side of the die 54. The material is continuously extruded using this device to manufacture a honeycomb structure 61.

In the honeycomb structure forming device 50, the die 54 is constituted of an inner portion 71 and an outer peripheral portion 72, the inner portion 71 protrudes toward the downstream side (to the downside in FIG. 2) to form a stepped portion 75 between the inner portion and the outer peripheral portion 72, the inner portion 71 is provided with slits 73 for forming a honeycomb structure, and the outer peripheral portion 72 is provided with slits 74 shorter than the slits 73. Moreover, a gap portion 57 for forming the outer wall of the honeycomb structure is formed between the die 54 and the pressing plate 55. It is to be noted that a pressing jig 58 and a back pressing plate 59 constitute a holder for setting the die 54 and the pressing plate 55.

During the extrusion by this honeycomb structure forming device 50, the forming material is extruded from the upstream side (the upside in FIG. 2) of the die 54 to the downstream side through the die 54 by an extruder (not shown). Moreover, the forming material extruded from the slits 73 disposed in the inner portion 71 of the die 54 opened on the downstream side forms the honeycomb structure constituted of a large number of cells. On the other hand, the honeycomb shape of the forming material extruded from the slits 74 disposed in the outer peripheral portion 72 of the die 54 is collapsed by the function of the gap portion 57. Moreover, when a proceeding direction is changed from the extruding direction to a stepped portion 75 direction and the pressing plate 55 is opened, the proceeding direction is changed to the extruding direction again to form an outer wall which surrounds the cells.

Moreover, in the manufacturing method of the die for forming the ceramic article by the extrusion disclosed in Japanese Patent No. 3648031, to precisely form the back holes which are provided in the die and through which the kneaded clay is supplied, electrolytic etching (electrical chemical machining: ECM processing) is used. Moreover, a method is disclosed in which slits are formed in the surface of the die for forming the ceramic article by the extrusion, and the surface of the die is subjected to electrolytic plating and then electroless plating.

Furthermore, in recent years, to improve the capability of removing the atmospheric contamination substances in accordance with a stricter exhaust gas environmental standard, there has been a demand for the higher density and precision of the thin walls of the honeycomb structure for use in a filter for purifying the exhaust gas.

FIG. 3 is a schematic plan view of the die 1 for use in a mold for forming a honeycomb structure as viewed from a supply end side provided with back holes 9 through which the kneaded clay is supplied. Heretofore, any problem has not been raised, but it has been found that in a case where the back holes 9 are formed by the ECM processing in order to form the die 1 in which a distance between the centers of the back holes is narrowed (from 0.5 to 1.8 mm) as shown in FIG. 3 to satisfy the demand for the higher density and precision of the thin walls of the honeycomb structure, unevenness of about 100 μm to 200 μm is generated around the back holes 9 in the supply end surface. FIG. 4 shows an enlarged region A of FIG. 3, and is a schematic plan view showing the unevenness around the back holes 9 in the supply end of the die 1 for use in the mold for forming the honeycomb structure. Regions α in FIG. 4 have a relatively high protruding state as compared with a surrounding area, and regions β have a lowly recessed state as compared with the regions α. These unevenness is generated owing to the EMC processing, but there is not any problem in a case where there is a large space between the back holes. As shown in FIG. 4, the regions β where there is a small space between the back holes 9 have the recessed state, and the regions α where there is a large space between the back holes 9 have the protruding state.

In a case where the honeycomb structure is formed using the mold for forming the ceramic article, the mold including the die 1, as shown in FIG. 10, a forming defect is easily generated in the vicinity of an outer wall 62 of a honeycomb structure 61. Specifically, in addition to a problem that a streak-like forming defect is generated in the surface of the outer wall, the width of a partition wall 67 close to the outer wall decreases, or easily fluctuates. When the first to fourth cells from the outer wall 62 of the honeycomb structure are cells 63, 64, 65 and 66 in the drawing, approximately the first to fifth cells easily cause the forming defects over the whole periphery of the outer wall, and the width of the partition wall 67 closer to the outer wall tends to decrease. Consequently, the decrease of the isostatic strength of the honeycomb structure 61 is caused.

This phenomenon will be described with reference to FIGS. 1 and 5 to 7 showing the enlarged vicinity of the outer peripheral portion 72 of the mold for forming the ceramic article, the mold having a constitution similar to that of the conventional honeycomb structure forming device 50 shown in the vertically sectional view of FIG. 2. In the mold for forming the honeycomb structure partially shown in FIG. 1, the back pressing portion 3 is constituted of a back pressing plate 12 and a back spacer 13, and the pressing portion 2 is constituted of a pressing plate 11 and a spacer 10, so that the die 1 is fixed. In the die 1, a kneaded clay supply end 22 is provided with a plurality of back holes 9, and an extrusion end 21 is provided with slits 8 which communicate with these back holes 9 to form the formed ceramic article by the extrusion.

FIG. 5 shows the enlarged vicinity of the outer periphery of the supply end 22 of a mold for forming a ceramic article partially shown in FIG. 1, and is a schematically enlarged sectional view cut along a straight line H of FIG. 3 in a vertical plane. The straight line H extends through the regions a raised in the protruding state in the uneven die surface, and the surface of the supply end 22 of the die 1 overlaps with the back spacer 13 without any gap therebetween, so that the kneaded clay does not flow between the adjacent back holes 9 of the corresponding portion. The flow of the kneaded clay is blocked by the back pressing portion 3 in the vicinity of the outer periphery (on the left side in the drawing), and the kneaded clay having a flow rate adjusted flows from the upside to the downside in an inner peripheral portion as shown by arrows.

FIG. 6 shows the enlarged vicinity of the outer periphery of the supply end 22 of the mold for forming the ceramic article partially shown in FIG. 1, and is a schematically enlarged sectional view cut along a straight line L of FIG. 3 in a vertical plane. The straight line L extends through the regions β lowered in the recessed state in the uneven die surface, and a gap is generated in a portion where the surface of the supply end 22 of the die 1 overlaps with the back spacer 13, so that the kneaded clay flows between the adjacent back holes 9 of this portion. The gap is generated between the supply end 22 and the back spacer 13 as shown in FIG. 6 because the regions β are lower than the regions α as shown in FIG. 3. In consequence, the flow of the kneaded clay is not sufficiently adjusted by the back pressing portion 3, and the kneaded clay is discharged to the back holes 9 in the vicinity of the outer periphery (on the left side in the drawing) in a lateral direction as shown by arrows in the drawing.

Thus, since the unevenness is generated in the surface of the supply end 22 of the die 1 as shown by the region A of FIG. 4, a gap is generated between the back pressing portion 3 and the recessed portion of the supply end 22 in a case where the back pressing portion 3 for adjusting the amount of the kneaded clay to be supplied covers the surface of the supply end 22 via the back spacer 13. Furthermore, the clay flows from this gap in the lateral direction as shown in FIG. 6, which results in a problem that the back spacer 13 is worn owing to an operation over a long period as shown in FIG. 7. When the amount of the kneaded clay to be supplied is not sufficiently adjusted by the back pressing portion 3, the kneaded clay is non-uniformly supplied to the outer wall portion of the formed honeycomb article, and the kneaded clay is not sufficiently supplied to the partition walls of the cells in the vicinity of the outer wall. Therefore, in particular, the thicknesses of the partition walls of the first to fifth cells from the outer wall decrease, and the decrease of the isostatic strength is incurred in a case where the honeycomb structure is prepared using the ceramic article formed by the extrusion.

SUMMARY OF THE INVENTION

The present invention has been developed in view of such a problem of a conventional technology, and an object thereof is to provide a mold for extrusion forming of ceramic articles which is preferably used for the extrusion forming of the ceramic articles. More particularly, there is provided a mold for extrusion forming of ceramic articles which is excellent in wear resistance and can remarkably decrease forming defects in the vicinity of outer peripheries thereof which are easily generated during the extrusion forming of the ceramic articles having highly dense thin walls.

In the present invention, a mold for extrusion forming of ceramic articles is provided as follows.

[1] A mold for extrusion forming of ceramic articles comprising: a die having a plurality of back holes which are provided in a supply end and through which a kneaded clay is supplied, and slits which are provided in an extrusion end so as to communicate with the plurality of back holes and through which the kneaded clay is extruded to form the ceramic articles; a back pressing plate and a back spacer which are arranged on the outer peripheral side of the supply end of the die to adjust the amount of the kneaded clay to be supplied; and a pressing plate and a spacer which are provided on the outer peripheral side of the extrusion end of the die to regulate the shape and size of the formed ceramic article, wherein at least a portion of the supply end of the die which overlaps with the back pressing plate is flattened, and a surface roughness (Ra) thereof is in a range of 0.05 μm to 10 μm.

[2] The mold for the extrusion forming of the ceramic articles according to [1], wherein the die is coated with a first coating film disposed on a base material made of a stainless steel and containing Ni as a main component and a second coating film further disposed on the first coating film and containing $W_3C$ as a main component.

[3] The mold for the extrusion forming of the ceramic articles according to [1] or [2], wherein the surface roughness (Ra) of the stainless steel base material of the die is in a range of 0.05 μm to 10 μm.

[4] The mold for the extrusion forming of the ceramic articles according to any one of [1] to [3], wherein the surface roughness (Ra) of the first coating film of the die is in a range of 0.05 μm to 10 μm.

[5] The mold for the extrusion forming of the ceramic articles according to any one of [1] to [4], wherein the surface roughness (Ra) of the second coating film of the die is in a range of 0.05 μm to 10 μm.

[6] The mold for the extrusion forming of the ceramic articles according to any one of [1] to [5], which is used for extrusion forming of ceramic honeycomb structures.

The mold for the extrusion forming of the ceramic articles in the present invention produces noticeable effects that the forming defects in the vicinity of the outer peripheries thereof which are easily generated during the extrusion forming of

DESCRIPTION OF THE PREFERRED EMBODIMENT

Figure 1:
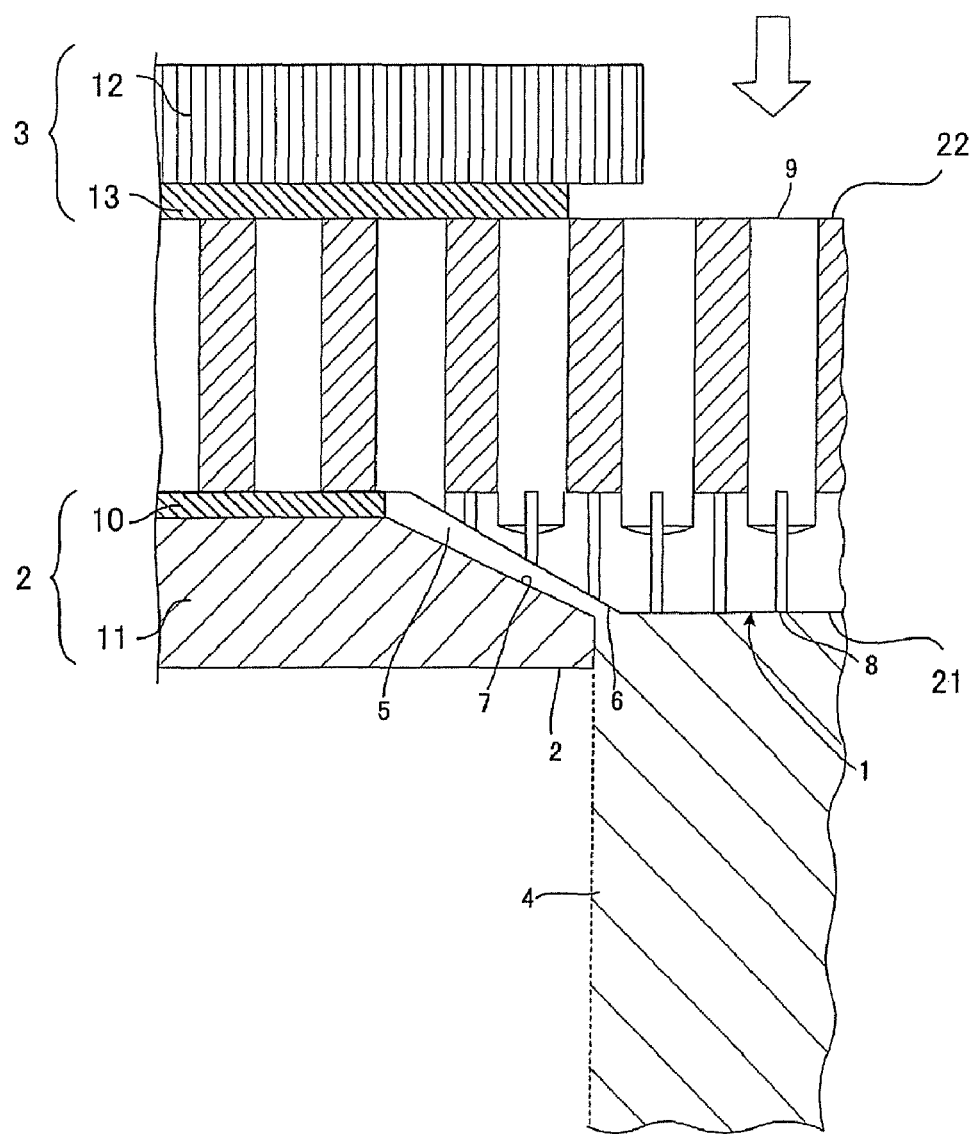
FIG. 1 is a schematically partially enlarged sectional view showing one example of a mold for extrusion forming of a ceramic honeycomb article.

Embodiments of the present invention will hereinafter be described appropriately with reference to the drawings, but the present invention is not limited to these embodiments, and can variously be altered, modified, improved or replaced based on the knowledge of any person skilled in the art without departing from the scope of the present invention.

A mold for extrusion forming of a ceramic article according to the present invention has a die having a plurality of back holes which are provided in a supply end and through which a kneaded clay is supplied, and slits which are provided in an extrusion end so as to communicate with the plurality of back holes and through which the kneaded clay is extruded to form the ceramic article. Furthermore, the mold for the extrusion forming of the ceramic article in the present invention has a back pressing plate and a back spacer which are arranged on the outer peripheral side of the supply end of this die to adjust the amount of the kneaded clay to be supplied; and a pressing plate and a spacer which are provided on the outer peripheral side of the extrusion end of this die to regulate the shape and size of the formed ceramic article. Moreover, at least a portion of the supply end of the die which overlaps with the back pressing plate is flattened, and a surface roughness (Ra) thereof is in a range of 0.05 μm to 10 μm.

Thus, the unevenness of the die surface generated in a case where a space between the adjacent back holes formed in the supply end of the die by ECM processing is narrowed is flattened. In consequence, the kneaded clay is prevented from flowing from an unintended gap generated between the back pressing plate and the die surface, and correct and uniform flow rate adjustment of the kneaded clay to the vicinity of the outer wall or outer periphery of the formed ceramic article can be performed. Therefore, the formed honeycomb article having highly dense and precise partition walls can be extrusion-formed. Furthermore, the surface roughness (Ra) of at least a portion of the supply end which overlaps with the back pressing plate is set to a range of 0.05 μm to 10 μm. Consequently, in a case where the back pressing plate is provided with the back spacer and the kneaded clay is allowed to flow from an intended gap between a portion of the back pressing plate which does not overlap with this back spacer and the die surface to finely adjust the flow rate of the kneaded clay, the flow rate of the kneaded clay can be set to a constant flow rate to realize stable adjustment of the kneaded clay flow rate.

It is to be noted that "the surface roughness" mentioned in the present specification is a surface roughness measured in conformity to JIS B0601 "Surface Roughness-Definition and Display". Specifically, an only portion having a reference length is extruded from a roughness curve in a direction of an average line, the surface roughness curve having this reference length is turned back at the average line as a reference, and a value obtained by dividing, by the reference length, an area surrounded by the surface roughness curve and the average line, and represented by micrometers (μm) is defined as the surface roughness (Ra). In this case, a reference length L=4 mm in the present invention. In the present invention, the flattening of the unevenness is an idea different from the adjusting of the surface roughness (Ra). The surface roughness (Ra) mentioned herein is based on the reference length L=4 mm, and the unevenness is the height difference of the surface excluding the back holes and is measured in a range of a distance (0.5 to 1.8 mm) between the centers of the adjacent back holes in the supply end surface or a longer distance.

Moreover, in the present invention, the die is coated with a first coating film disposed on a base material made of a stainless steel and containing Ni as a main component and a second coating film further disposed on the first coating film and containing $W_3C$ as a main component, to secure a wear resistance. Furthermore, when the surface roughness (Ra) of each of the stainless steel base material, the first coating film containing Ni as the main component and the second coating film containing $W_3C$ as the main component is set to a range of 0.05 μm to 10 μm, the flow rate of the kneaded clay flowing through a micro space between the back pressing plate and the die supply end surface is set to a constant flow rate to contribute to the stabilization of the flow rate adjustment. In addition, "containing the substance as the main component" mentioned herein indicates that the component is contained in a range of 70 to 100 mass %.

A method for finishing the die surface so that the surface roughness (Ra) of especially at least the portion of the surface which overlaps with the back pressing plate is in a range of 0.05 μm to 10 μm includes a surface processing treatment of a mother material such as a stainless steel or SKD subjected to processing of a nearly mirror surface, by directly using sand blast (Nos. #10 to #8000). Alternatively, after roughly forming the surface by use of such sand blast, on the mother material or the surface of the mother material, there may be formed a plating layer containing as main components one or more substances selected from the group consisting of Ni, TiC, TiN, TiCN, DLC, CrN and $W_3C$, a CVD or PVD layer or a composite plating layer where hard powder of SiC, diamond, CBN or the like is dispersed in a nickel plating film.

Moreover, in addition to the method for adjusting the surface roughness (Ra) by the sand blast, examples of the surface finishing method include a method in which a processing roughness obtained by grinding the surface through wire power discharge processing is utilized, and a method in which WC powder is physically evaporated to add a WC particle layer as a non-uniformly rough membrane on the surface of the above mother material or the surface of the above plating layer, so that the surface roughness (Ra) is set to a range of 0.05 μm to 10 μm.

It is to be noted that in the mold for the extrusion forming of the ceramic article according to the present invention, a method may be used in which the surface roughness (Ra) is eventually set to the range of 0.05 μm to 10 μm by any means such as the sand blast, the wire power discharge processing or the membrane obtained by physically evaporating WC particles. In this case, the mold for the extrusion forming of the ceramic article is preferably coated with a wear resistant material from the viewpoints of the lengthening of the life of the mold and the wear resistance.

Figure 2:
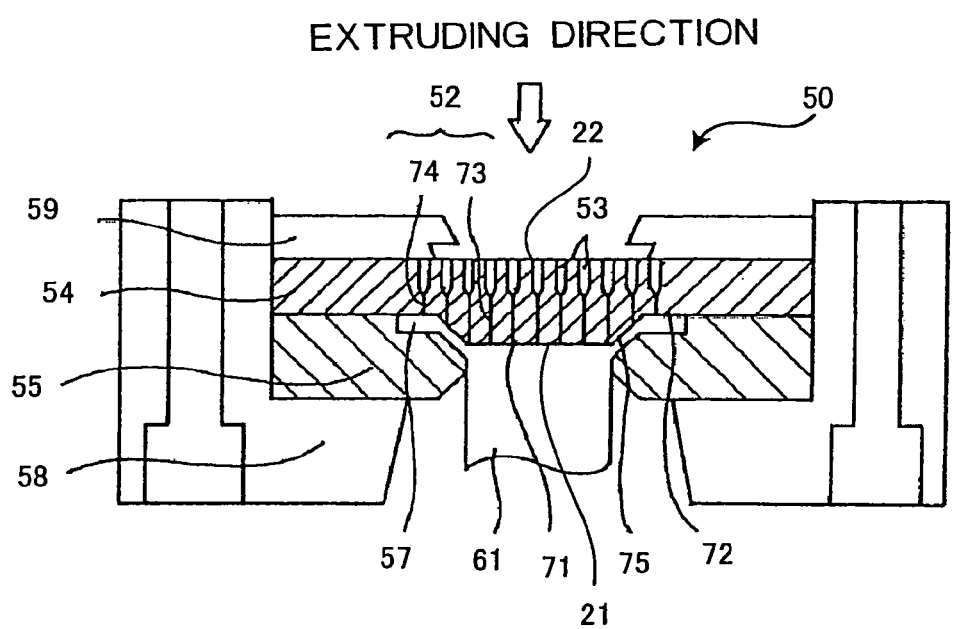
FIG. 2 is a schematically sectional view showing one example of an extrusion device of the formed ceramic honeycomb article.

Next, the mold for the extrusion forming of the ceramic article in the present invention will be described with reference to the drawings. FIG. 1 is a schematically partially enlarged sectional view showing one example of a mold for extrusion forming of a ceramic honeycomb article, and is used as an explanatory view of a preferable configuration of the present invention. FIG. 2 is a schematically sectional view showing a conventional extrusion device of the formed ceramic article, and similarly shows a constitution of one example of the mold for the extrusion forming of the ceramic honeycomb article as the preferable configuration of the present invention.

In the mold for the extrusion forming of the ceramic article shown in FIG. 1, a die 1 is constituted of slits 8 provided in an extrusion end 21 and connected to one another so as to extrusion-form the ceramic honeycomb article, and a plurality of back holes 9 provided in a supply end 22 and independently provided so that each of the back holes is partially connected to one end of each slit 8 at a predetermined depth in the die 1. The peripheral edge of the extrusion end 21 having the slits 8 is inclined in an outer peripheral direction to provide an inclined face 6. In a position facing the inclined face 6 on the outer peripheral side of the die 1, a pressing plate 11 is fixed to the die 1 via a spacer 10 so as to define the outer wall of the formed ceramic honeycomb article, and a gap 5 is formed between a facing face 7 of this pressing plate 11 and the inclined face 6. It is to be noted that the pressing portion 2 includes the pressing plate 11 and the spacer 10.

Moreover, in addition to the die 1 and a pressing portion 2 which defines the outer wall of the formed ceramic honeycomb article to be arranged on the outer peripheral side of the die 1, the mold for the extrusion forming of the ceramic article shown in FIG. 1 includes a back pressing portion 3 similarly arranged on the outer peripheral side of the die 1 to adjust the amount of the kneaded clay to be extruded. A structure of the back pressing portion 3 will be described in more detail. In FIG. 1, on a kneaded ceramic clay supply end 22 side of the back holes 9 of the die 1, a back spacer 13 for finely adjusting the amount of the kneaded clay, and a back pressing plate 12 formed outside this back spacer 13 so as to finely adjust the amount of the kneaded ceramic clay are provided, and this back spacer 13 and the back pressing plate 12 constitute the back pressing portion 3. A portion of the back spacer 13 which overlaps with the supply end 22 of the die 1 stops the supply of the kneaded clay. The kneaded ceramic clay is supplied to a space intentionally provided in a portion where the back pressing plate 12 overlaps with the supply end 22 without interposing the back spacer 13, and the kneaded clay is supplied to the vicinity of the outer wall or the outer peripheral portion of the formed article.

In the above mold for the extrusion forming of the ceramic article shown in FIG. 1, the kneaded clay extruded from the gap 5 between the die 1 and the pressing plate 11 forms the outer peripheral portion (the outer wall) of a formed ceramic article 4. Moreover, when the dimensions and shapes of the back pressing plate 12 and the back spacer 13 in the back pressing portion 3 are specifically selected, the flow rate of the kneaded clay to this outer peripheral portion (the outer wall) and the vicinity of the outer peripheral portion can correctly be adjusted.

Figure 3:
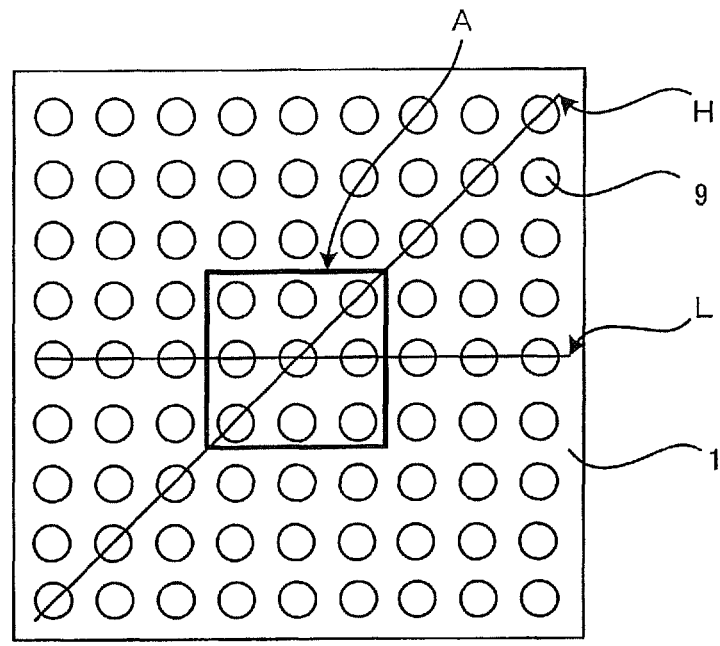
FIG. 3 is a schematic plan view as viewed from a die supply end.
Figure 4:
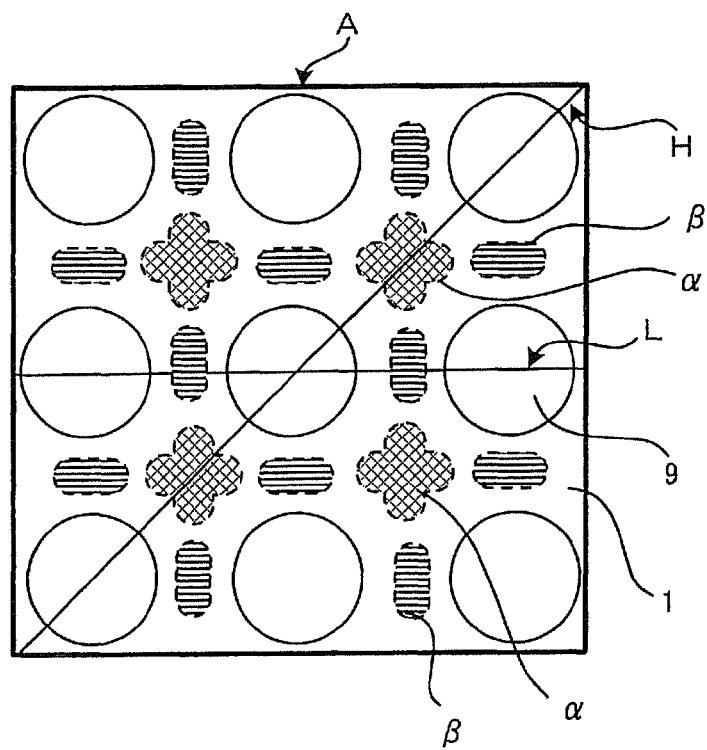
FIG. 4 is a schematic plan view showing a region A of FIG. 3 and explaining an uneven surface between back holes.
Figure 5:
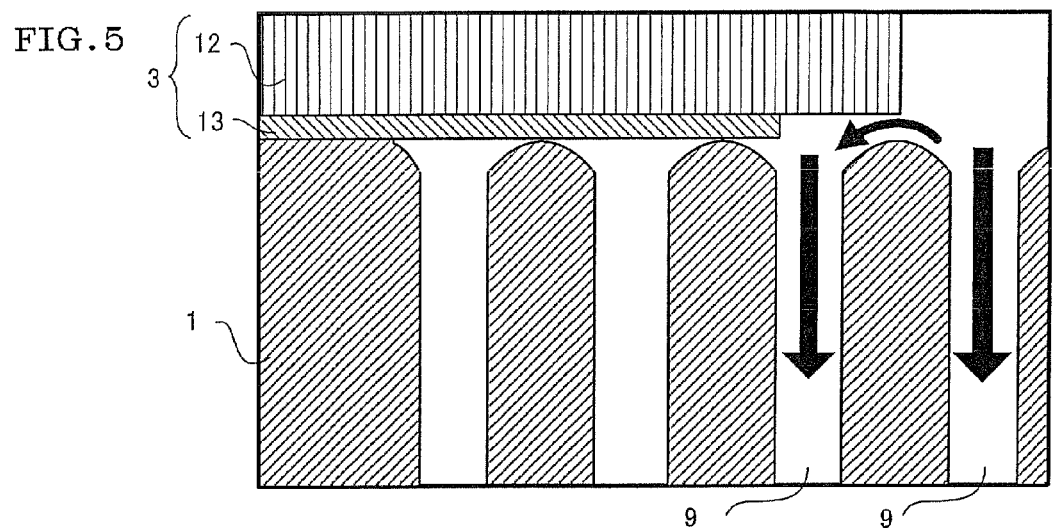
FIG. 5 is a schematically partially enlarged sectional view of a mold for forming a ceramic article cut along a straight line H of FIG. 3 in a vertical plane.
Figure 6:
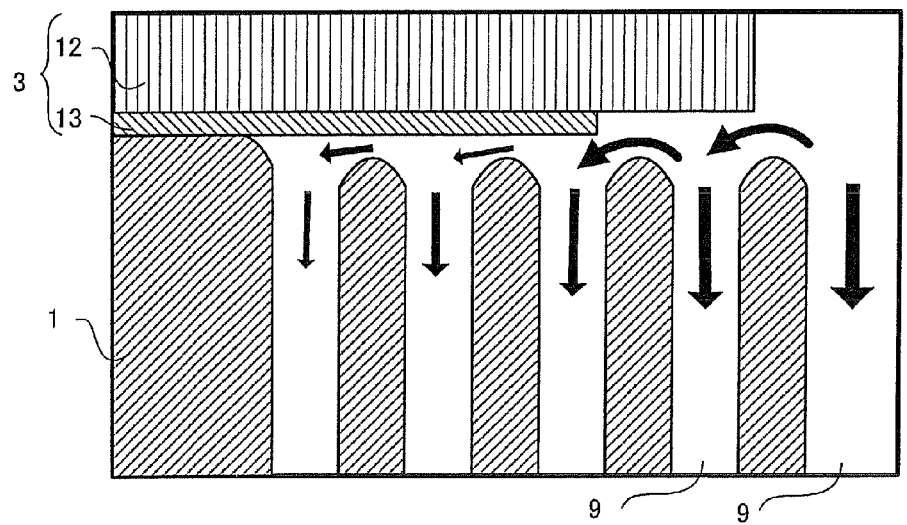
FIG. 6 is a schematically partially enlarged sectional view of the mold for forming the ceramic article cut along a straight line L of FIG. 3 in the vertical plane.
Figure 7:
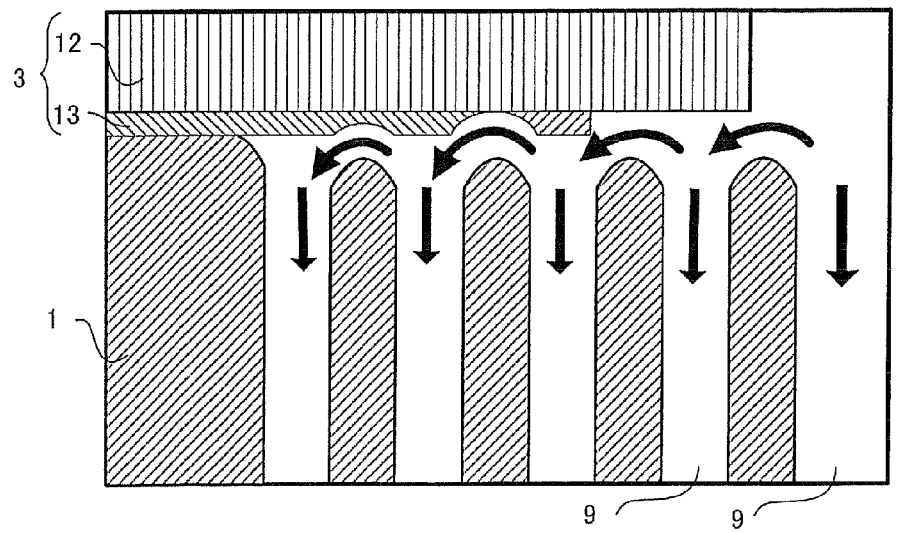
FIG. 7 is a schematically partially enlarged sectional view cut along the straight line L of FIG. 3 in the vertical plane and explaining a back spacer worn phenomenon.
Figure 8:
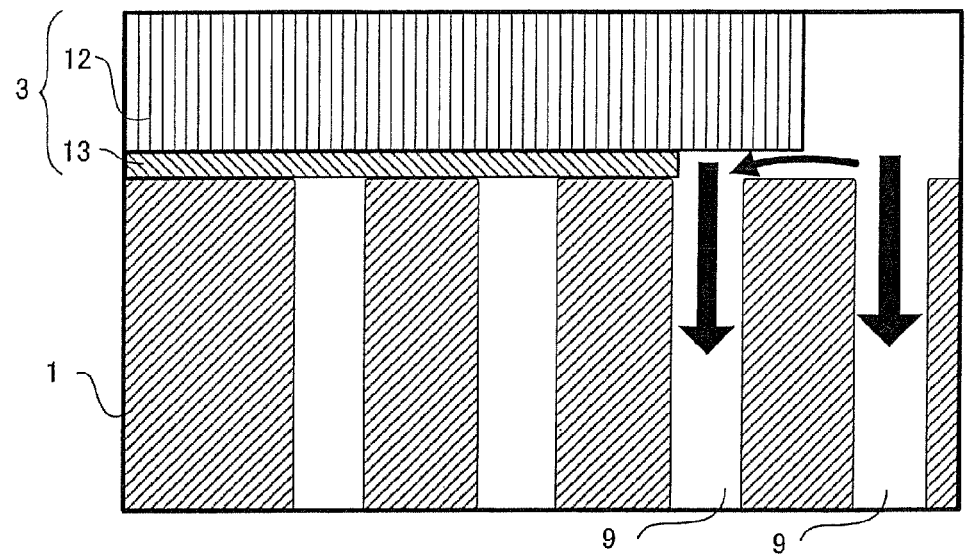
FIG. 8 is a schematically sectional view of a mold for forming a ceramic article of the present invention cut along the straight line H of FIG. 3 in the vertical plane.

FIG. 8 shows the enlarged vicinity of the outer periphery of the supply end 22 of the mold for forming the ceramic article partially shown in FIG. 1 in the present invention, and is a schematically enlarged sectional view of the die 1 cut along a straight line H of FIG. 3 in a vertical plane. In a conventional die, the straight line H extends through regions α raised in a protruding state in the unevenness of the die surface. However, in the present invention, since the supply end 22 of the die is flattened, any kneaded clay does not flow between the adjacent back holes 9 of this portion. The flow of the kneaded clay is blocked in the vicinity of the outer periphery (on the left side in the drawing) by the back pressing portion 3, and the kneaded clay having the flow rate adjusted flows from the upside to the downside in the inner peripheral portion as shown by arrows.

Figure 9:
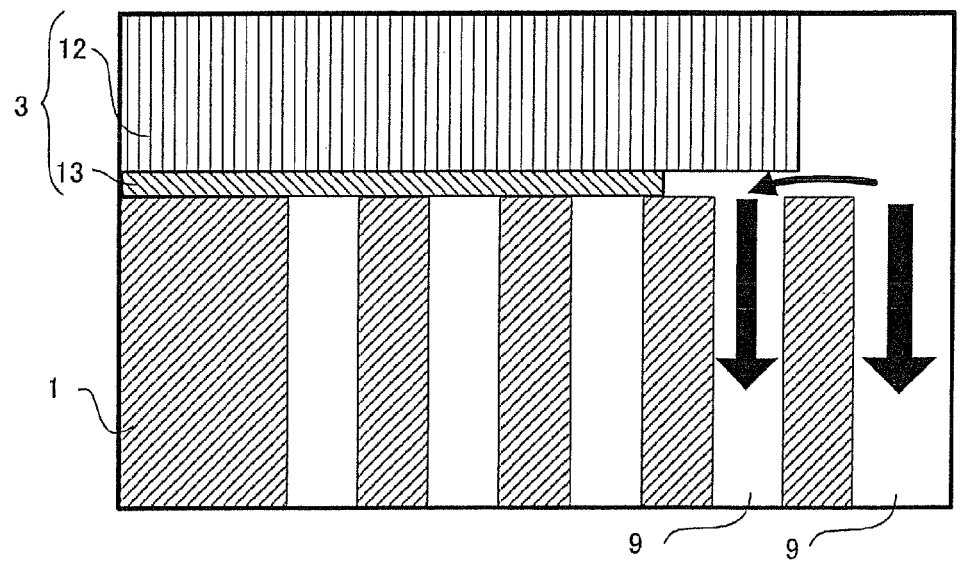
FIG. 9 is a schematically sectional view of the mold for forming the ceramic article of the present invention cut along the straight line L of FIG. 3 in the vertical plane.
Figure 10:
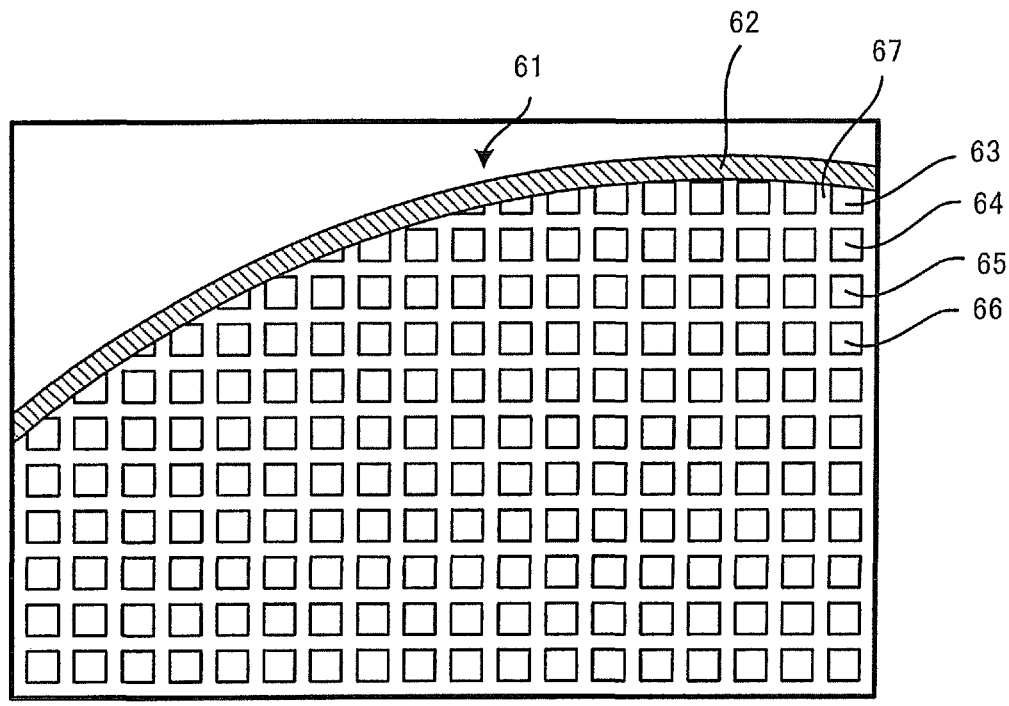
FIG. 10 is a partially enlarged explanatory view in the vicinity of the outer periphery of an extrusion-formed ceramic article, explaining a portion in which a forming defect is generated.
Figure 11:
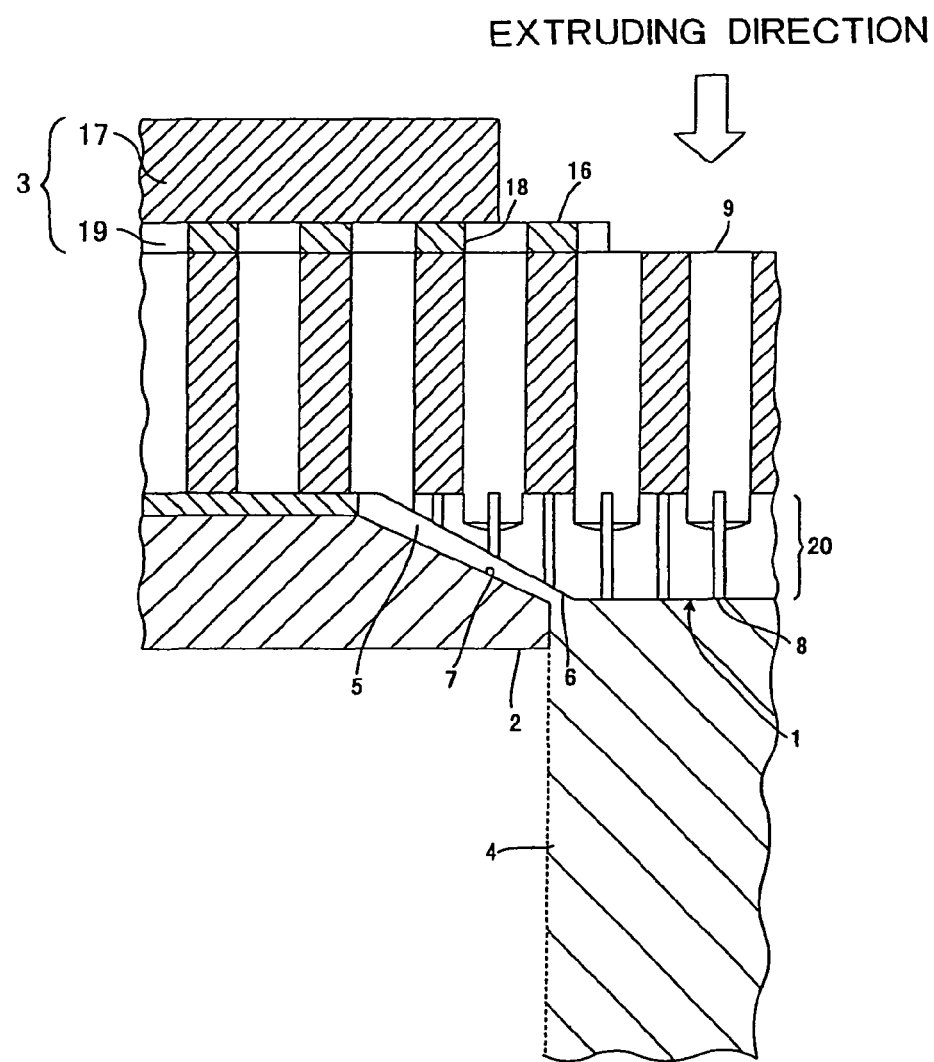
FIG. 11 is a schematically sectional view showing one example of a mold for extrusion forming of a ceramic honeycomb article.

FIG. 9 shows the enlarged vicinity of the outer periphery of the supply end 22 of the mold for forming the ceramic article partially shown in FIG. 1, and is a schematically enlarged sectional view cut along a straight line L of FIG. 3 in the vertical plane. In the conventional die, the straight line L extends through regions β lowered in a recessed state in the unevenness of the die surface. However, in the present invention, since the supply end 22 of the die is flattened, any kneaded clay does not flow between the adjacent back holes 9 of this portion. The flow of the kneaded clay is blocked in the vicinity of the outer periphery (on the left side in the drawing) by the back pressing portion 3, and the kneaded clay having the flow rate adjusted flows from the upside to the downside in the inner peripheral portion as shown by arrows.

As shown in both of FIGS. 8 and 9, at least the portion of the supply end 22 of the die 1 which overlaps with the back pressing portion 3 is flattened, the surface roughness (Ra) is in a range of 0.05 μm to 10 μm, and the kneaded clay flows from the intended gap between the back pressing plate 12 and the supply end 22 of the die 1. The back spacer 13 is hardly worn, and the kneaded clay to the outer wall and the outer peripheral portion of the formed ceramic article can finely and correctly be adjusted stable over a long period.

EXAMPLES

Next, based on examples and comparative examples of the present invention, as to a die constituting a mold for extrusion forming of a ceramic article, comparative investigation of a fluctuation (%) of partition walls of the extrusion-formed honeycomb-shaped article, the presence of a streak on the surface of an outer wall and the isostatic strength (MPa) of a honeycomb structure prepared using this formed article was performed in accordance with whether or not unevenness between back holes 9 was flattened, and the surface roughness (Ra) of a supply end. The isostatic strength was tested and evaluated in conformity to Car Standard JASO Standard M505-87 issued by Society of Automotive Engineers of Japan. In this test, the honeycomb structure was put in a rubber cylindrical container, and the container was closed with a lid constituted of an aluminum plate to perform isotropically pressurizing compression in water. The test is the simulation of the applying of a compressive load in a case where the outer peripheral surface of the honeycomb structure is grasped in a converter can member.

A kneaded argillaceous clay was extruded using the mold for the extrusion forming of the ceramic article. It is to be noted that the kneaded clay is obtained by adding a binder component and additive water to material powder of alumina, kaolin, silica or talc to knead the same by a kneading device (not shown).

It is to be noted that in Table 1 in which the following examples and comparative examples and the results are summarized, in the case of the flattening of the unevenness, by a method of subjecting a stainless steel die as a mother material to sand blast (Nos. #36 to #1000) after surface cutting, a method of subjecting the uneven surface of the stainless steel die to wire power discharge processing or the like, the unevenness is adjusted to at least 65 μm as the maximum particle diameter of the kneaded clay or less, preferably 20 μm or less, further preferably 10 μm or less, and each surface roughness (Ra) is adjusted.

Examples

Comparative Example 1

In a step of preparing a die for forming a honeycomb article, when a base material made of a stainless steel for the die is subjected to ECM processing, an unevenness of about 100 μm is generated in the surface of a supply end 22 provided with a plurality of back holes. Instead of performing a flattening treatment of this die, the surface of the die was coated with an Ni plating film (a coating film containing 80 (mass %) or more of Ni as a component and having a thickness of 40 μm) and a further $W_3C$ film (a coating film containing 70 (mass %) or more of $W_3C$ as a component and having a thickness of 10 μm), the above kneaded ceramic clay was extruded, and it was judged whether the extrusion was satisfactory or defective. Results are shown in Table 1. The surface roughness (Ra) of each of the Ni plating film and the $W_3C$ film was equal to that of the base material of the stainless steel.

Comparative Example 2

In a step of preparing a die for forming a honeycomb article, when a base material made of a stainless steel for the die is subjected to ECM processing, an unevenness of about 100 μm is generated in the surface of a supply end 22 provided with a plurality of back holes. To remove this unevenness, the unevenness of about 100 μm on the surface was removed by grinding to form a flat surface. At this time, the unevenness, that is, a height difference was about 5 μm. In this state, the die surface having a surface roughness (Ra) of about 0.01 μmRa was obtained. Afterward, the surface was coated with an Ni plating film (a coating film containing 80 (mass %) or more of Ni as a component and having a thickness of 40 μm) and a further $W_3C$ film (a coating film containing 70 (mass %) or more of $W_3C$ as a component and having a thickness of 10 μm). The above kneaded ceramic clay was extruded, and it was judged whether the extrusion was satisfactory or defective. Results are shown in Table 1. The surface roughness (Ra) of each of the Ni plating film and the $W_3C$ film was equal to that of the base material of the stainless steel.

Comparative Example 3

In a step of preparing a die for forming a honeycomb article, when a base material made of a stainless steel for the die is subjected to ECM processing, an unevenness of about 100 μm is generated in the surface of a supply end 22 provided with a plurality of back holes. To remove this unevenness, the unevenness of about 100 μm on the surface was removed by grinding to form a flat surface. At this time, the unevenness, that is, a height difference was about 5 μm. In this state, the die surface having a surface roughness (Ra) of about 0.01 μmRa was obtained. The surface roughness (Ra) of this surface was set to 12 μm by blast No. #36. Afterward, the surface was coated with an Ni plating film (a coating film containing 80 (mass %) or more of Ni as a component and having a thickness of 40 μm) and a further $W_3C$ film (a coating film containing 70 (mass %) or more of $W_3C$ as a component and having a thickness of 10 μm). The above kneaded ceramic clay was extruded, and it was judged whether the extrusion was satisfactory or defective. Results are shown in Table 1. The surface roughness (Ra) of each of the Ni plating film and the $W_3C$ film was equal to that of the base material of the stainless steel.

Example 1

In a step of preparing a die for forming a honeycomb article, when a base material made of a stainless steel for the die is subjected to ECM processing, an unevenness of about 100 μm is generated in the surface of a supply end 22 provided with a plurality of back holes. To remove this unevenness, the unevenness of about 100 μm on the surface was removed by grinding to form a flat surface. At this time, the unevenness, that is, a height difference was about 5 μm. In this state, the die surface having a surface roughness (Ra) of about 0.01 μmRa was obtained. The surface roughness (Ra) of this surface was set to 0.05 μm by blast No. #1000. Afterward, the surface was coated with an Ni plating film (a coating film containing 80 (mass %) or more of Ni as a component and having a thickness of 40 μm) and a further $W_3C$ film (a coating film containing 70 (mass %) or more of $W_3C$ as a component and having a thickness of 10 μm). The above kneaded ceramic clay was extruded, and it was judged whether the extrusion was satisfactory or defective. Results are shown in Table 1. The surface roughness (Ra) of each of the Ni plating film and the $W_3C$ film was equal to that of the base material of the stainless steel.

Examples 2, 3 and 5

The above kneaded ceramic clay was extruded in the same manner as in Example 1 except the surface roughness (Ra) of the die surface, and it was judged whether the extrusion was satisfactory or defective. Results are shown in Table 1. The surface roughness (Ra) in each example was as follows.

Example 2

The surface roughness (Ra) of a base material of a stainless steel was set to 0.5 μm by blast No. #600, and then the surface was coated with an Ni plating film and a $W_3C$ film. The surface roughness (Ra) of each of the Ni plating film and the $W_3C$ film was equal to that of the base material of the stainless steel.

Example 3

The surface roughness (Ra) of a base material of a stainless steel was set to 1.0 μm by blast No. #300, and then the surface was coated with an Ni plating film and a $W_3C$ film. The surface roughness (Ra) of each of the Ni plating film and the W₃C film was equal to that of the base material of the stainless steel.

Example 5

The surface roughness (Ra) of a base material of a stainless steel was set to 10 μm by blast No. #46, and then the surface was coated with an Ni plating film and a W₃C film. The surface roughness (Ra) of each of the Ni plating film and the W₃C film was equal to that of the base material of the stainless steel.

forming of the back holes, the surface roughness (Ra) of the supply end of the die (or at least the portion of the supply end which overlaps with the back pressing plate) needs to be set to a range of 0.05 μm to 10 μm. Furthermore, it has been found that the surface roughness (Ra) of at least the supply end of the die (or at least the portion of the supply end which overlaps with the back pressing plate) is further preferably in a range of 0.5 μm to 2 μm.

TABLE 1

|  | Presence of flattening of unevenness between back holes | Height difference of unevenness between back holes (μm) | Surface roughness of base material of stainless steel (μmRa) | Surface roughness of Ni plating film (μmRa) | Surface roughness of W₃C film (μmRa) | Cell wall thickness fluctuation (%) | Isostatic strength (MPa) | Presence of surface streak |
|---|---|---|---|---|---|---|---|---|
| Comparative Example 1 | None | 100 | 2 | 2 | 2 | 10% | 1 MPa | None |
| Comparative Example 2 | Present | 5.3 | 0.01 | 0.01 | 0.01 | 8% | 0.5 MPa | None |
| Comparative Example 3 | Present | 25.5 | 12 | 12 | 12 | 15% | 1.5 MPa | Present |
| Example 1 | Present | 5.3 | 0.05 | 0.05 | 0.05 | 5% | 3.5 MPa | None |
| Example 2 | Present | 5.7 | 0.5 | 0.5 | 0.5 | 0% | 5 MPa | None |
| Example 3 | Present | 5.8 | 1.0 | 1.0 | 1.0 | 0% | 5 MPa | None |
| Example 4 | Present | 20.2 | 2.0 | 2.0 | 2.0 | 0% | 6 MPa | None |
| Example 5 | Present | 20.3 | 10 | 10 | 10 | 5% | 2.5 MPa | None |

Example 4

In a step of preparing a die for forming a honeycomb article, when a base material made of a stainless steel for the die is subjected to ECM processing, an unevenness of about 100 μm is generated in the surface of a supply end 22 provided with a plurality of back holes. To remove this unevenness, the unevenness of about 200 μm on the surface was removed by wire power discharge processing to form a flat surface. At this time, the unevenness, that is, a height difference was about 20 μm. When the wire power discharge processing was used, the die surface having a surface roughness (Ra) of about 2.0 μm was obtained. Afterward, the surface was coated with an Ni plating film (a coating film containing 80 (mass %) or more of Ni as a component and having a thickness of 40 μm) and a further W₃C film (a coating film containing 70 (mass %) or more of W₃C as a component and having a thickness of 10 μm). The above kneaded ceramic clay was extruded, and it was judged whether the extrusion was satisfactory or defective. Results are shown in Table 1. The surface roughness (Ra) of each of the Ni plating film and the W₃C film was equal to that of the base material of the stainless steel.

As seen from the results of Table 1, in Comparative Example 1, since any flattening treatment between back holes was not performed, the thicknesses of partition walls of cells fluctuated, and eventually isostatic strength lowered. In Comparative Examples 2, 3, even when the flattening treatment was performed, an appropriate die surface roughness (Ra) was not obtained, and the partition wall thicknesses fluctuated. In Comparative Example 3, the generation of surface streaks was observed.

It has been clarified from the results of Table 1 that in addition to the flattening treatment of the unevenness generated in the supply end (a portion which overlaps with a back pressing plate) of the die in the ECM processing during the As described above, according to a mold for extrusion-forming of a ceramic article in the present invention, an outer peripheral forming defect easily generated during the extrusion forming of the ceramic article can be decreased. Moreover, the present invention is preferably usable in extrusion-forming a ceramic honeycomb structure or the like having a high density, a high precision and a high isostatic strength. Such a ceramic honeycomb structure removes atmospheric contamination substances in an exhaust gas discharged from an internal combustion engine, a boiler or the like, and is hence preferably used as a catalyst carrier, a filter for collecting diesel fine particles or the like.

What is claimed is:

1. A mold for extrusion forming of ceramic articles comprising:
   a die having a plurality of back holes which are provided in a supply end and through which a kneaded clay is supplied, and slits which are provided in an extrusion end so as to communicate with the plurality of back holes and through which the kneaded clay is extruded to form the ceramic articles;
   a back pressing plate and a back spacer which are arranged on an outer peripheral side of the supply end of the die to adjust an amount of the kneaded clay to be supplied; and
   a pressing plate and a spacer which are provided on an outer peripheral side of the extrusion end of the die to regulate a shape and a size of the formed ceramic articles, wherein
   at least a portion of the supply end of the die which overlaps with the back pressing plate is flattened so that over any distance between adjacent back holes, a height difference between protrusions and recesses, which were formed by electrical chemical machining (ECM), does not exceed 65 μm,
   a surface roughness (Ra) of the portion of the supply end is in a range of 0.05 μm to 10 μm, and
   a distance between the centers of the adjacent back holes is 0.5 mm to 1.8 mm.

2. The mold for the extrusion forming of the ceramic articles according to claim 1, wherein the die is coated with a first coating film disposed on a base material made of a stainless steel and containing Ni as a main component and a second coating film further disposed on the first coating film and containing $W_3C$ as a main component.

3. The mold for the extrusion forming of the ceramic articles according to claim 2, wherein a surface roughness (Ra) of the stainless steel base material of the die is in a range of 0.05 µm to 10 µm.

4. The mold for the extrusion forming of the ceramic articles according to claim 2, wherein a surface roughness (Ra) of the first coating film of the die is in a range of 0.05 µm to 10 µm.

5. The mold for the extrusion forming of the ceramic articles according to claim 3, wherein a surface roughness (Ra) of the first coating film of the die is in a range of 0.05 µm to 10 µm.

6. The mold for the extrusion forming of the ceramic articles according to claim 2, wherein a surface roughness (Ra) of the second coating film of the die is in a range of 0.05 µm to 10 µm.

7. The mold for the extrusion forming of the ceramic articles according to claim 3, wherein a surface roughness (Ra) of the second coating film of the die is in a range of 0.05 µm to 10 µm.

8. The mold for the extrusion forming of the ceramic articles according to claim 4, wherein a surface roughness (Ra) of the second coating film of the die is in a range of 0.05 µm to 10 µm.

9. The mold for the extrusion forming of the ceramic articles according to claim 5, wherein a surface roughness (Ra) of the second coating film of the die is in a range of 0.05 µm to 10 µm.

10. An extruder for forming ceramic honeycomb structures comprising: the mold for the extrusion forming of the ceramic articles according to claim 1.

* * * * *